US007679707B2

(12) United States Patent
Tanaka

(10) Patent No.: US 7,679,707 B2
(45) Date of Patent: Mar. 16, 2010

(54) LIQUID CRYSTAL DISPLAY DEVICE COMPRISING A FIRST ELECTRODE IN CONTACT WITH A BOTTOM SURFACE AND A SECOND ELECTRODE IN CONTACT WITH A TOP SURFACE OF A SINGLE LAYER INSULATING FILM COMPRISING CONCAVE AND CONVEX PORTIONS

(75) Inventor: Yoshiki Tanaka, Mizuho (JP)

(73) Assignee: Sanyo Epson Imaging Devices Corp., Tokyo (JP)

( * ) Notice: Subject to any disclaimer, the term of this patent is extended or adjusted under 35 U.S.C. 154(b) by 240 days.

(21) Appl. No.: 11/699,031

(22) Filed: Jan. 29, 2007

(65) Prior Publication Data

US 2007/0182899 A1 Aug. 9, 2007

(30) Foreign Application Priority Data

Feb. 9, 2006 (JP) .............................. 2006-031921

(51) Int. Cl.
  G02F 1/1333 (2006.01)
  G02F 1/1343 (2006.01)
(52) U.S. Cl. ...................... 349/138; 349/122; 349/141
(58) Field of Classification Search ................ 349/141, 349/122, 138
See application file for complete search history.

(56) References Cited

U.S. PATENT DOCUMENTS 6,507,383 B1 * 1/2003 Abe et al. .................... 349/141
6,704,085 B2 * 3/2004 Nishimura et al. .......... 349/141

FOREIGN PATENT DOCUMENTS

JP 2002-296611 10/2002

* cited by examiner

Primary Examiner—Andrew Schechter
Assistant Examiner—Charles Chang
(74) Attorney, Agent, or Firm—Morrison & Foerster LLP

(57) ABSTRACT

A wide viewing angle is achieved with a liquid crystal display device according to an embodiment of this invention, in which alignment directions of liquid crystal molecules are controlled by electric field between electrodes on a substrate. A pixel electrode and an insulating film covering the pixel electrode are formed on a TFT substrate. A plurality of concave portions and convex portions extending in parallel to each other are formed in the insulating film alternately. A common electrode is formed on each of the concave portions. And a CF substrate is disposed facing to the common electrodes. A liquid crystal layer is disposed between the insulating film and the common electrodes and the liquid crystal layer. When a predetermined voltage is applied to the pixel electrode to induce an electric field between the pixel electrode and the common electrodes, liquid crystal molecules are rotated along lines of electric force of the electric field in a plane parallel to the TFT substrate. Also, the liquid crystal molecules tilt vertically between the common electrodes symmetrically with respect to a center line between a neighboring pair of the common electrodes.

13 Claims, 4 Drawing Sheets

LIQUID CRYSTAL DISPLAY DEVICE COMPRISING A FIRST ELECTRODE IN CONTACT WITH A BOTTOM SURFACE AND A SECOND ELECTRODE IN CONTACT WITH A TOP SURFACE OF A SINGLE LAYER INSULATING FILM COMPRISING CONCAVE AND CONVEX PORTIONS

CROSS-REFERENCE OF THE INVENTION

This application claims priority from Japanese Patent Application No. 2006-031921, the content of which is incorporated herein by reference in its entirety.

BACKGROUND OF THE INVENTION

1. Field of the Invention

This invention relates to a liquid crystal display device, specifically to a liquid crystal display device in which the alignment direction of liquid crystal molecules is controlled by an electric field between electrodes on the same substrate.

2. Description of the Related Art

As one way of achieving a wide viewing angle for a liquid crystal display device, a method has been developed to realize a light switching function by rotating the liquid crystal molecules in a plane parallel to the substrate with a lateral electric field generated between the electrodes on the same substrate. In-Plane Switching (hereafter referred to as IPS) method and Fringe-Field Switching (hereafter referred to as FFS) method are examples of such a technology.

A conventional liquid crystal display device using the FFS method will be explained referring to the drawings. FIGS. 6 and 7 show cross-sectional views of a display pixel in the conventional liquid crystal display device using the FFS method. FIG. 6 shows the display pixel when no voltage is applied to a pixel electrode 12 that is to be described later, and FIG. 7 shows the display pixel when a voltage is applied to the pixel electrode 12.

A TFT (Thin Film Transistor) substrate 10 faces a light source BL as a first transparent substrate made of a glass substrate or the like, as shown in FIG. 6. A first polarizing plate 11 that linearly polarizes light from the light source BL is formed on a surface of the TFT substrate 10 facing the light source BL. The pixel electrode 12 to which the voltage is applied in response to a display signal is formed on another surface of the TFT substrate 10 that is not facing the light source BL. An insulating film 43 is formed on the pixel electrode 12 to cover it. Common electrodes 14 extending parallel to each other at predetermined intervals are formed on the insulating film 43. A first alignment film 15 covering the common electrodes 14 is formed on the insulating film 43.

A color filter substrate (hereafter referred to as CF substrate) 20 faces the common electrodes 14 as a second transparent substrate made of a glass substrate or the like. A color filter 21 and a second alignment film 22 are formed on a surface of the CF substrate 20 facing the common electrodes 14. A second polarizing plate 23 is formed on another surface of the CF substrate 20 that is not facing the common electrodes 14. The first and second polarizing plates 11 and 23 are disposed so that their polarization axes are perpendicular to each other. A liquid crystal layer 30 is sealed between the TFT substrate 10 and the CF substrate 20.

In the liquid crystal display device described above, an average direction of alignment (hereafter simply referred to as alignment direction) of liquid crystal molecules 31 in the liquid crystal layer 30 in a state where no voltage is applied to the pixel electrode 12 is perpendicular to a polarization axis of the first polarizing plate 11 in a plane parallel to the TFT substrate 10. The linearly polarized light outgoing from the first polarizing plate 11 does not go through the second polarizing plate 23 because its polarization axis is perpendicular to the polarization axis of the second polarizing plate 23. That is, black is displayed.

On the other hand, when the voltage is applied to the pixel electrode 12 to induce an electric field between the pixel electrode 12 and the common electrodes 14, the liquid crystal molecules 31 are rotated along lines of electric force of the electric field in a plane parallel to the TFT substrate 10, as shown in FIG. 7. In this case, the linearly polarized light outgoing from the first polarizing plate 11 becomes elliptically polarized light after traveling through the liquid crystal layer 30. That is, there is a component of linearly polarized light that goes through the second polarizing plate 23. In this case, white is displayed.

The alignment direction of the liquid crystal molecules 31 is tilted to a tangential direction of the lines of electric force of the electric field in a plane perpendicular to the TFT substrate 10 in the vicinity of the insulating film 43 between the common electrodes 14. That is, the alignment directions of the liquid crystal molecules 31 tilt symmetrically with respect to a center line between a neighboring pair of the common electrodes 14. Dependence on the viewing angle is cancelled out by the symmetrical tilt of the alignment directions, making it possible to achieve the wide viewing angle.

Technologies mentioned above are disclosed in Japanese Patent Application Publication No. 2002-296611.

Although the liquid crystal display device described above contributes to wider viewing angle in displaying white when the voltage is applied to the pixel electrode 12 to induce the electric field between the pixel electrode 12 and the common electrodes 14, it has not been considered sufficient. This invention is directed to improving the wide viewing angle characters of the conventional display device in which the alignment direction of the liquid crystal molecules is controlled by the electric field between the electrodes on the same substrate.

SUMMARY OF THE INVENTION

This invention offers a liquid crystal display device having a plurality of display pixels, each of which includes a first transparent substrate, a first transparent electrode formed on the first transparent substrate, an insulating film that covers the first transparent electrode and has a plurality of concave portions and convex portions extending parallel to each other, a second transparent electrode formed on each of the convex portions, a second transparent substrate and liquid crystal sealed between the first transparent substrate and the second transparent substrate.

DETAILED DESCRIPTION OF THE INVENTION

Figure 1A:
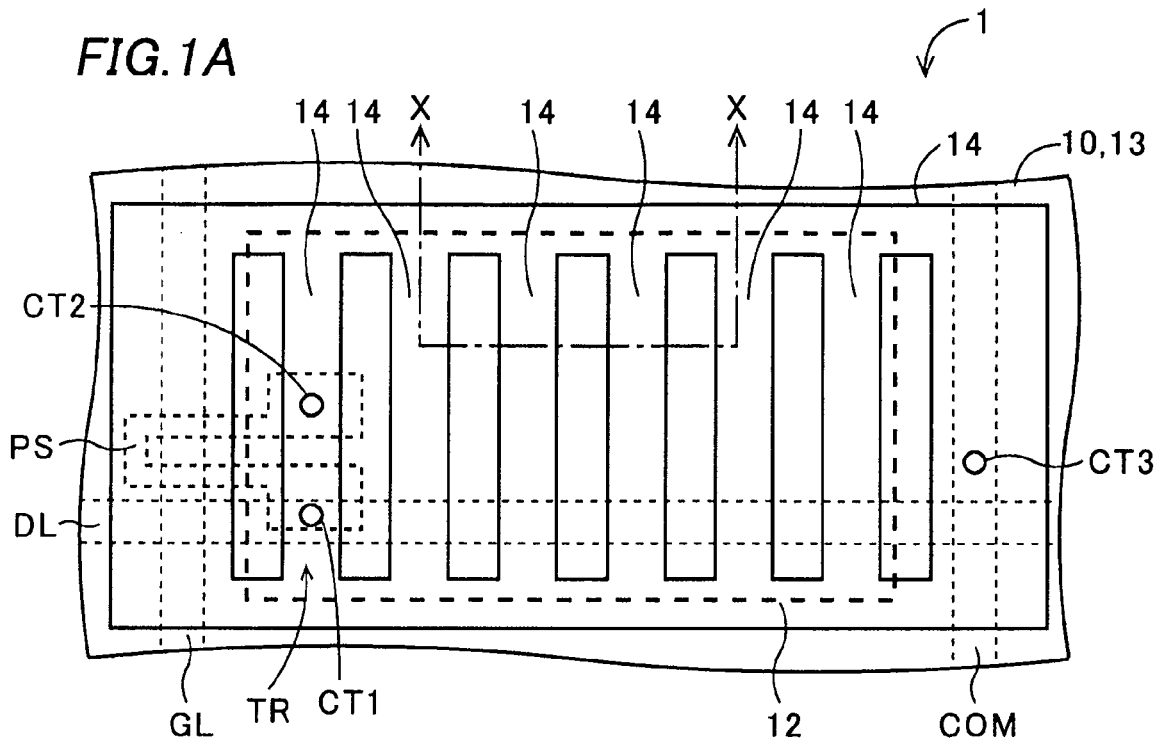
FIG. 1A is a plan view showing a pixel in a liquid crystal display device according to an embodiment of this invention.
Figure 1B:
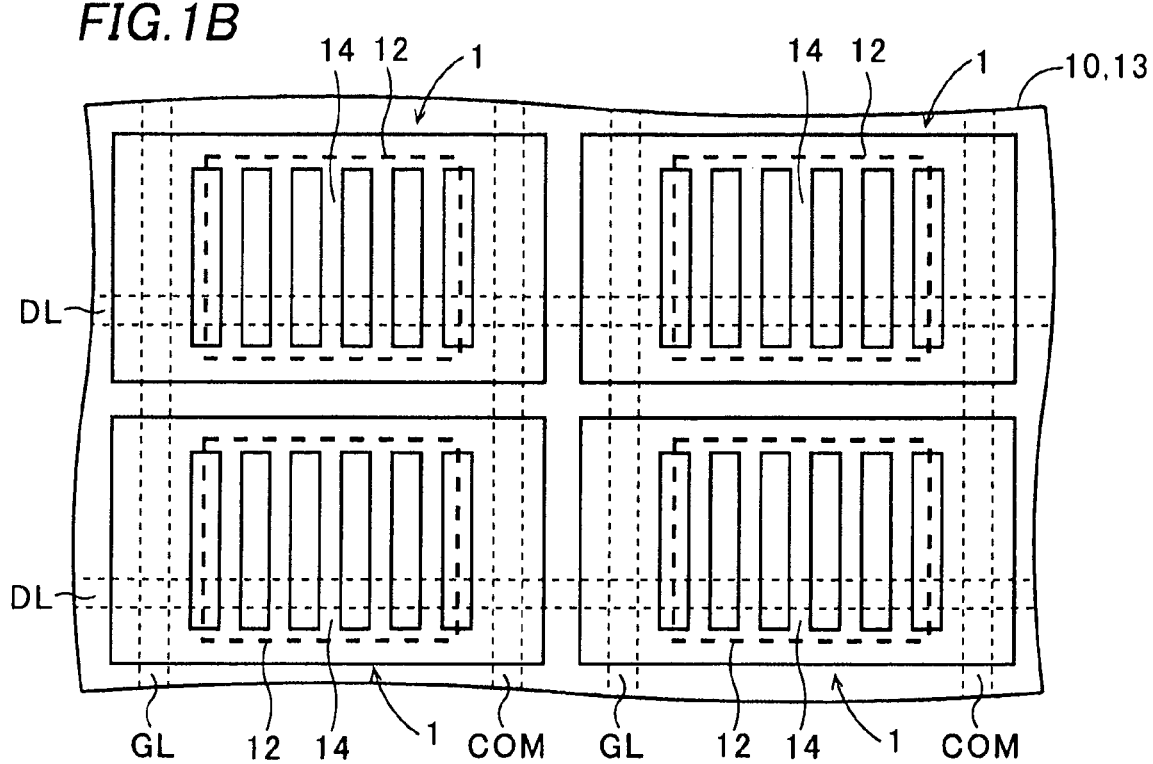
FIG. 1B shows a multiple pixel configuration of the embodiment.
Figure 2:
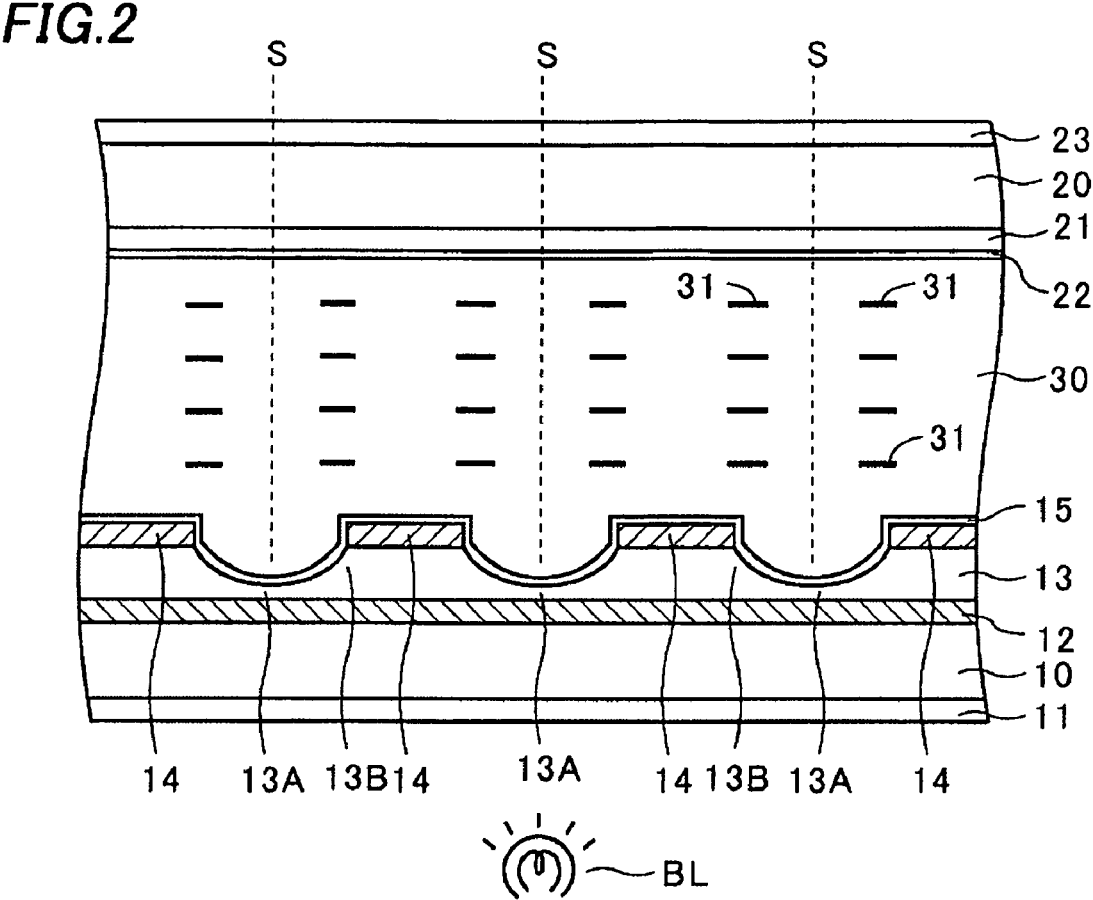
FIG. 2 is a cross-sectional view showing a section X-X in FIG. 1A.
Figure 3:
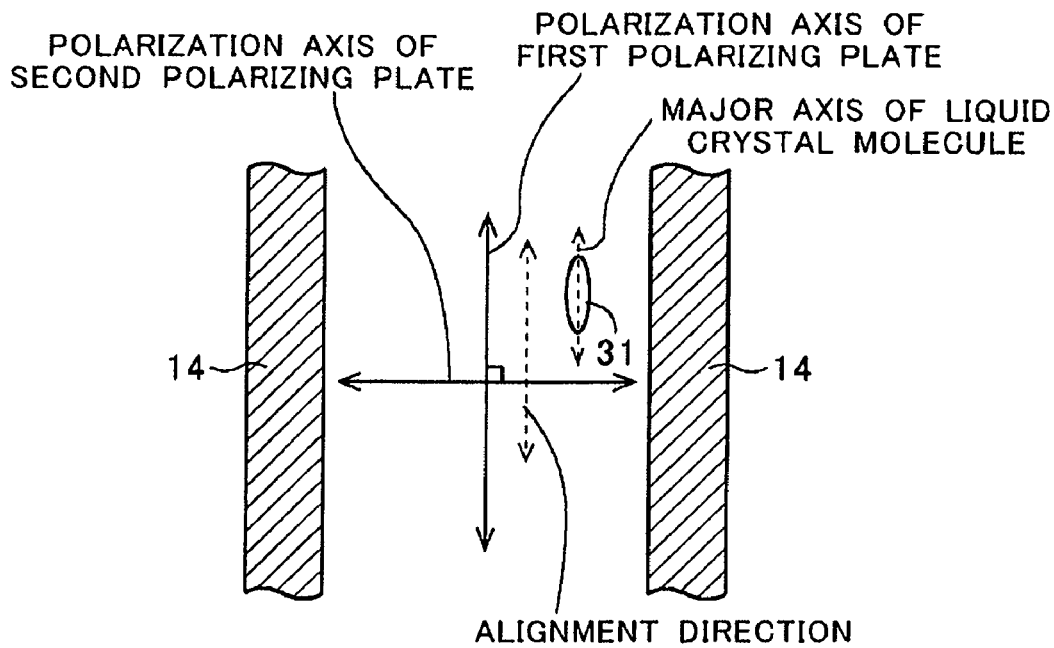
FIG. 3 is a plan view showing an alignment direction of a liquid crystal molecule shown in FIG. 2.

A liquid crystal display device according to an embodiment of this invention will be described hereafter referring to the drawings. FIG. 1A is a plan view showing a pixel 1 in the liquid crystal display device according to the embodiment of this invention. FIG. 1B shows an example of multiple pixel configuration of this embodiment. FIG. 2 is a cross-sectional view of a section X-X in FIG. 1A, schematically showing alignment directions of liquid crystal molecules 31 in a state where no voltage is applied to a pixel electrode 12, which will be described later. FIG. 3 is a plan view schematically showing the alignment direction of the liquid crystal molecule 31 shown in FIG. 2.

Figure 4:
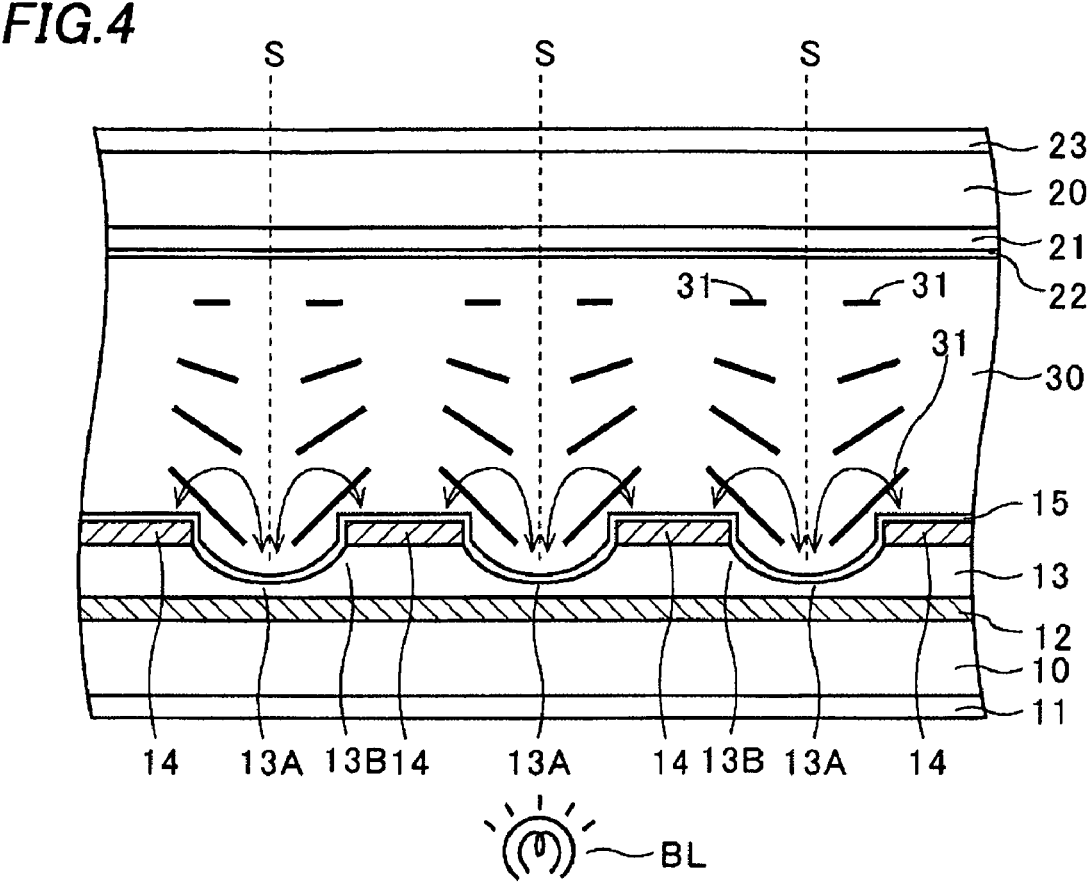
FIG. 4 is a cross-sectional view showing the section X-X in FIG. 1A.
Figure 5:
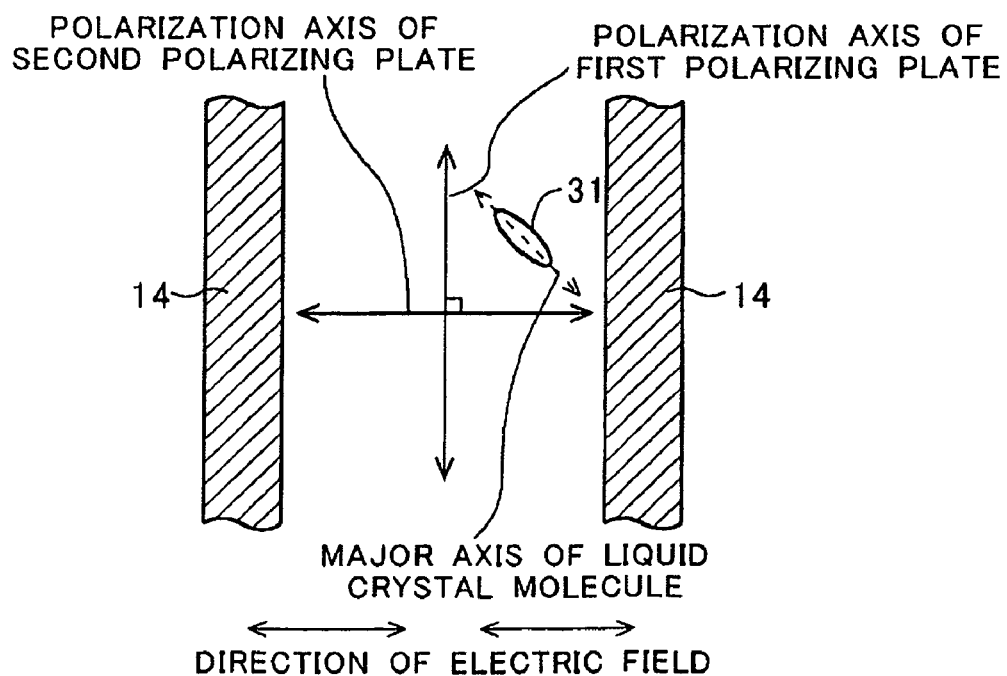
FIG. 5 is a plan view showing an alignment direction of a liquid crystal molecule shown in FIG. 4.
Figure 6:
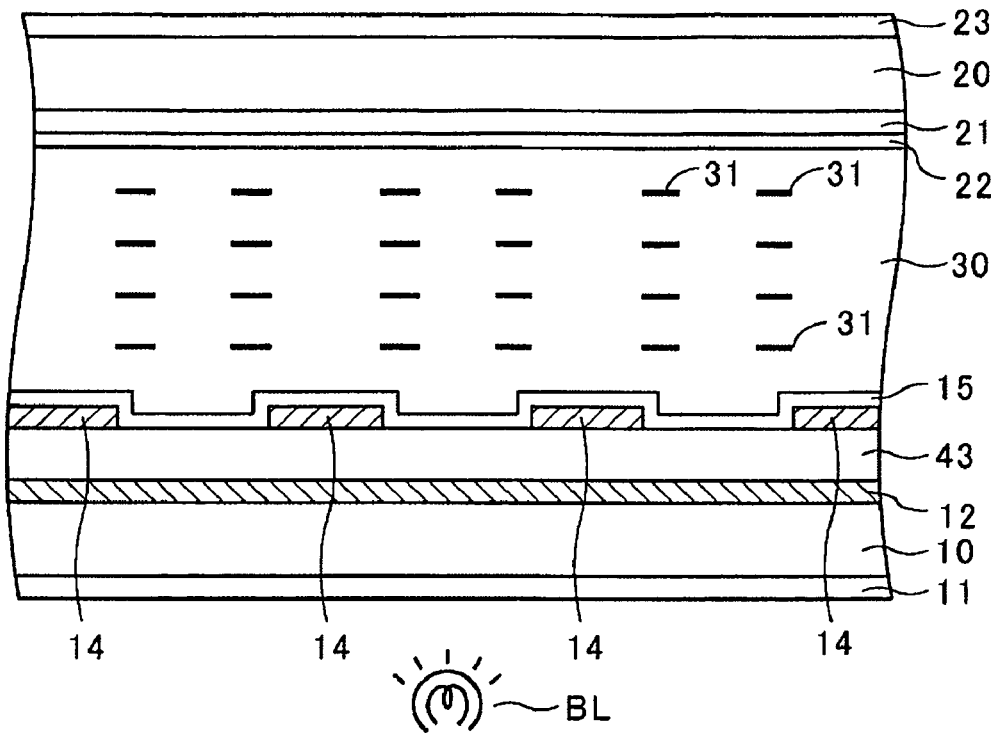
FIG. 6 is a cross-sectional view showing a pixel in a liquid crystal display device according to a prior art.
Figure 7:
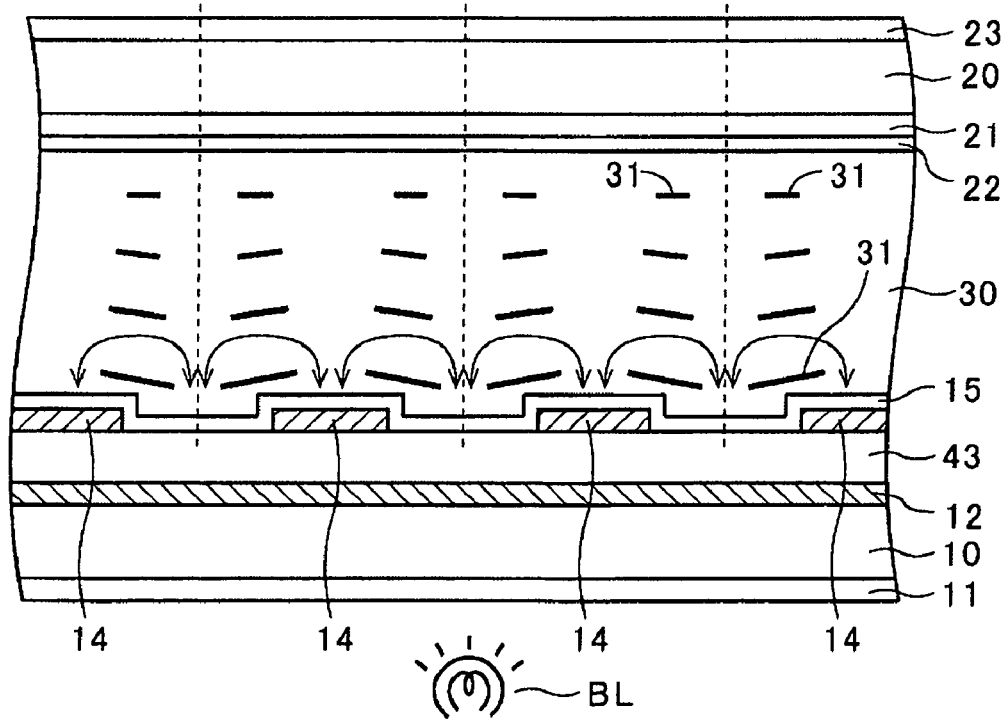
FIG. 7 is a cross-sectional view showing the pixel in the liquid crystal display device according to the prior art.

FIG. 4 is a cross-sectional view of the section X-X in FIG. 1A, schematically showing the alignment directions of the liquid crystal molecules 31 in a state where a predetermined voltage is applied to the pixel electrode 12, which will be described later. FIG. 5 is a plan view schematically showing the alignment direction of the liquid crystal molecule 31 shown in FIG. 4. In FIGS. 1-5, the same numerals are assigned to the same components as those shown in FIGS. 6 and 7.

First, a structure of the liquid crystal display device is described referring to the drawings. A plurality of display pixels is formed on a first transparent substrate, i.e. a TFT substrate 10, made of glass or the like, as shown in FIGS. 1 and 2. FIG. 1A shows only one pixel 1 out of the plurality of pixels, and components other than primary components are omitted in the figure.

A thin film transistor for pixel selection (hereafter referred to as a pixel selection transistor) TR is formed in the display pixel 1 on the TFT substrate 10. The pixel selection transistor TR is composed of an active layer PS formed on the TFT substrate 10 through an insulating film (not shown), a gate line GL formed on the active layer PS through a gate insulation film (not shown), and an interlayer insulating film and a planarization film (not shown) that cover the gate line GL. A drain region in the active layer PS is connected through a contact CT1 with a display signal line DL through which a display signal is provided.

On the planarization film (not shown), there is formed the pixel electrode 12 connected with a source region in the active layer PS through a contact CT2. The pixel electrode 12 is a transparent electrode made of ITO (Indium Tin Oxide), for example, and is patterned for each of the pixels.

In addition, an insulating film 13 made of silicon oxide film or a silicon nitride film is formed to cover the pixel electrode 12. A plurality of concave portions 13A and convex portions 13B extending in parallel to each other are formed in the insulating film 13 alternately. A thickness of the insulating film 13 is 0-150 μm, for example, at the thinnest location and 200-400 μm, for example, at the thickest location. The concave portions 13A and the convex portions 13B are formed by etching under predetermined conditions regions of the insulating film 13 where the concave portions 13A are to be formed. Or, the concave portions 13A and the convex portions 13B are formed by growing a film made of the same insulating film as the insulating film 13 on regions where the convex portions 13B are to be formed after forming a flat insulating film 13.

Common electrode 14 that is a transparent electrode made of ITO (Indium Tin Oxide), for example, is formed on each of the convex portions 13B in the insulating film 13. Although the common electrodes 14 are made of lines extending in parallel to each other and separated by a predetermined spacing from each other, they are connected together outside of the pixel electrode 12. Also, the common electrodes 14 are connected through a contact CT3 with a common electric potential line COM through which a common electric potential is provided. A first alignment film 15 covering the common electrodes 14 is formed over the insulating film 13.

The concave portions 13A, the convex portions 13B and the common electrodes 14 will be described in detail. It is preferable that a cross-sectional shape of the concave portion 13A is symmetrical or approximately symmetrical with respect to a center line S between a neighboring pair of the common electrodes 14.

A CF substrate 20 faces the common electrodes 14 as a second transparent substrate made of a glass substrate or the like. A color filter 21 and a second alignment film 22 are formed on a surface of the CF substrate 20 facing the common electrodes 14. A second polarizing plate 23 is formed on another surface of the CF substrate 20 that is not facing the common electrodes 14. The first and second polarizing plates 11 and 23 are disposed so that their polarization axes are perpendicular to each other.

A liquid crystal layer 30 is sealed between the TFT substrate 10 and the CF substrate 20.

The liquid crystal molecules 31 constituting the liquid crystal layer 30 are nematic liquid crystal molecules having a positive dielectric anisotropy. An alignment direction, i.e. a major axis of the liquid crystal molecules 31 in the liquid crystal layer 30 in a state where no voltage is applied to the pixel electrode 12 is parallel to the polarization axis of the first polarizing plate 11 in a plane parallel to the TFT substrate 10. The alignment direction is determined to be a predetermined alignment direction of the first and second alignment films 15 and 22. An angle formed by the polarization axis of the first polarizing plate 11 and a direction of extension of the common electrodes 14 is assumed to be in a range of 0-10 degrees.

Next, an operation of the liquid crystal display device described above will be explained referring to the drawings. The alignment direction of the liquid crystal molecules 31 in the liquid crystal layer 30 in the state where no voltage is applied to the pixel electrode 12 is kept parallel to the polarization axis of the first polarizing plate 11 in the plane parallel to the TFT substrate 10, as shown in FIGS. 2 and 3. Linearly polarized light that is light emitted from a light source BL and polarized by passing through the first polarizing plate 11 does not go through the second polarizing plate 23 because its polarization axis is perpendicular to the polarization axis of the second polarizing plate 23. That is, black is displayed.

On the other hand, when the voltage is applied to the pixel electrode 12 to induce an electric field between the pixel electrode 12 and the common electrodes 14, the liquid crystal molecules 31 are rotated along lines of electric force of the electric field in a plane parallel to the TFT substrate 10, as shown in FIGS. 4 and 5. The linearly polarized light after passing through the first polarizing plate 11 is changed to elliptically polarized light because of birefringence during traveling through the liquid layer 30. That is, there is a component of linearly polarized light that goes through the second polarizing plate 23. In this case, white is displayed.

The alignment direction of the liquid crystal molecules 31 is tilted to a tangential direction of the lines of electric force of the electric field in a vertical direction of the TFT substrate 10 in the vicinity of the insulating film 13 between the common electrodes 14, as shown in FIG. 4. That is, the alignment directions of the liquid crystal molecules 31 become symmetrical with respect to the center line S between each neighboring pair of the common electrodes 14.

In addition, unlike the conventional device, the concave portions 13A in the insulating film 13 are formed in the embodiment of this invention. As a result, the liquid crystal molecules 31 in the vicinity of the insulating film 13 above the concave portions 13A are more susceptible to influence of the electric field extending in slanting directions in a plane perpendicular to the TFT substrate 10. That is, the alignment directions of the liquid crystal molecules 31 are tilted symmetrically with respect to the center line S between each neighboring pair of the common electrodes 14 along the lines of electric force of the electric field extending in the slanting directions more pronouncedly than in the conventional device.

Furthermore, because the cross-sectional shape of the concave portion 13A is symmetrical or approximately symmetrical with respect to the center line S between each neighboring pair of the common electrodes 14 in the embodiment, dependence on the viewing angle due to the alignment directions of the liquid crystal molecules 31 is more easily cancelled out.

Therefore, canceling out the dependence on the viewing angle and achieving wide viewing angle can be carried out better than in the conventional device. Also, the wide viewing angle can be achieved using conventional components without relying on a viewing angle compensation film.

Note that the liquid crystal molecules 31 and the first and second polarizing plates 11 and 23 used in the embodiment are not limited to those described above and may be liquid crystal molecules suitable for methods other than the FFS method and polarizing plates having polarization axes other than the polarization axes described above.

A better wide viewing angle can be achieved with a liquid crystal display device according to the embodiment of this invention, in which the alignment directions of the liquid crystal molecules are controlled by the electric field between the electrodes on the substrate.

What is claimed is:

1. A liquid crystal display device comprising a plurality of display pixels, each of the pixels comprising:
   a first transparent substrate;
   a first transparent electrode disposed on the first transparent substrate;
   an insulating film covering the first transparent electrode and comprising a plurality of elongated concave portions and a plurality of elongated convex portions extending in the same direction as the elongated concave portions;
   a second transparent electrode disposed on each of the elongated convex portions of the insulating film;
   a second transparent substrate; and
   a liquid crystal layer disposed between the first transparent substrate and the second transparent substrate,
   wherein the entire top surface of each of the elongated convex portions is covered by the second transparent electrode between two corresponding elongated concave portions, and
   the insulating film is formed of a single layer so that a top surface of the single layer is in contact with the second transparent electrode and a bottom surface of the single layer is in contact with the first transparent electrode.

2. The liquid crystal display device of claim 1, further comprising a thin film transistor that provides the first transparent electrode with a display signal.

3. The liquid crystal display device of claim 1, further comprising a common electric potential line that provides the second transparent electrode with a common electric potential.

4. The liquid crystal display device of claim 2, further comprising a common electric potential line that provides the second transparent electrode with a common electric potential.

5. The liquid crystal display device of claim 1, wherein each of the elongated concave portions is symmetrical with respect to a plane that is normal to the first transparent substrate and intersects a center line between two adjacent corresponding second transparent electrodes.

6. The liquid crystal display device of claim 2, wherein each of the elongated concave portions is symmetrical with respect to a plane that is normal to the first transparent substrate and intersects a center line between two adjacent corresponding second transparent electrodes.

7. The liquid crystal display device of claim 3, wherein each of the elongated concave portions is symmetrical with respect to a plane that is normal to the first transparent substrate and intersects a center line between two adjacent corresponding second transparent electrodes.

8. The liquid crystal display device of claim 4, wherein each of the elongated concave portions is symmetrical with respect to a plane that is normal to the first transparent substrate and intersects a center line between two adjacent corresponding second transparent electrodes.

9. The liquid crystal display device of claim 1, wherein in plan view of each pixel all of the elongated convex portions of the insulating film overlap completely with the first transparent electrode between two corresponding elongated concave portions of the insulating film.

10. The liquid crystal display device of claim 1, wherein in plan view of each pixel the first transparent electrode is of a square shape.

11. The liquid crystal display device of claim 1, wherein in plan view of each pixel the second transparent electrode is of a square shape and includes slits corresponding to the elongated concave portions of the insulating film.

12. The liquid crystal display device of claim 1, wherein a contour of the second transparent electrode contains a counter of the first transparent electrode in plan view of each pixel.

13. The liquid crystal display device of claim 1, wherein the concave portions do not cut through the single layer so that the concave portions are substantially round at a bottom thereof in a cross sectional view of each pixel.

* * * * *